United States Patent [19]

Der

[11] 4,031,005

[45] June 21, 1977

[54] CONTROLLABLE SORBENT BROADCASTER

[75] Inventor: James J. Der, Monterey Park, Calif.

[73] Assignee: The United States of America as represented by the Secretary of the Navy, Washington, D.C.

[22] Filed: Aug. 23, 1976

[21] Appl. No.: 716,916

[52] U.S. Cl. .............................. 209/236; 209/284; 210/DIG. 26; 222/189; 222/252; 222/371
[51] Int. Cl.² .......................................... B07B 1/02
[58] Field of Search ....... 210/40, 83, 242, DIG. 26; 222/169, 410, 189, 252, 371; 209/236, 284; 239/689, 672, 678

[56] References Cited

UNITED STATES PATENTS

| | | | |
|---|---|---|---|
| 2,269,046 | 1/1942 | Whitehead et al. | 209/284 |
| 2,454,662 | 11/1948 | Marsh | 209/236 |
| 2,940,639 | 6/1960 | Winter | 222/169 X |
| 3,581,899 | 6/1971 | Hunter | 210/DIG. 26 |
| 3,752,762 | 8/1973 | Cincotta | 210/DIG. 26 |
| 3,756,509 | 9/1973 | Hamnes | 239/678 |
| 3,783,129 | 1/1974 | Bunn | 210/DIG. 26 |
| 3,800,950 | 4/1974 | Hess et al. | 210/DIG. 26 |

Primary Examiner—Theodore A. Granger
Attorney, Agent, or Firm—Richard S. Sciascia; Joseph M. St.Amand; Darrell E. Hollis

[57] ABSTRACT

A device which can efficiently broadcast oil sorbent materials at a controlled rate, uniformly over an oil slick for the purpose of removing the oil from the water's surface. The device comprises a rotating cylinder of wire mesh having a moving endless belt disposed therein. The endless belt uniformly distributes the sorbent material within the wire mesh cylinder. The sorbent material is dropped onto the oil slick at a controlled rate by the rotating wire mesh cylinder.

5 Claims, 5 Drawing Figures

CONTROLLABLE SORBENT BROADCASTER

BACKGROUND OF THE INVENTION

1. Field of the Invention.

This invention relates generally to sorbent material broadcasters and more particularly to such sorbent material broadcasters that are capable of distributing sorbent materials at a controlled rate uniformly over an oil slick.

2. Description of the Prior Art.

Spills of liquid hydrocarbon compounds such as petroleum crude oil, fuel oil and the like present a serious water pollution problem and various means have been proposed to quickly remove such spills before contamination of the sea bottom and adjacent shoreline occurs. Such spills occur both in protected waters such as harbors and also occur in offshore or unprotected waters. Spills in harbors result principally from oil transfer operations, industrial waste discharges, pipeline breaks, collisions and the like, and generally amount to volumes in the order of 100 barrels. Spills in offshore waters normally result from collisions or grounding of tankers in merchant vessels or as a result of malfunction of an offshore oil rig. Although less frequent, such offshore spills are often very large. The offshore type of oil spill is particularly difficult to deal with because of the wave action which interferes both with efficient consolidation or confinement of the oil slick to a small area and also with the mechanical separation of the oil from the water's surface.

Various means have been employed in an effort to clean up spilled oil including the use of chemicals to cause sinking or dispersion of the oil and the distribution of absorbent materials on the surface of the slick. In addition, burning of the slick has been attempted as well as skimming of the surface oil by means of rotating cylinders, suction devices, and the like.

Chemically caused sinking or dispersion of the oil pollutes the water in the harbor or sea bottom. Burning or incineration is objectionable because of atmospheric pollution and because of the difficulty in maintaining the oil slick at a temperature high enough to sustain combustion. The skimming process which is capable of removing relatively large quantities of oil at a comparative high rate undesirably requires large and expensive settling or centrifuging devices which depend for efficient operation upon a relatively precise orientation of the weir or other skimming device relative to the thickness of the surface film of oil. Wave action in unprotected waters makes the skimming process very impractical.

The distribution of sorbent materials on the surface of the oil slick by mechanical broadcasting followed by the harvesting and regenerating of the oil sorbent material is a most effective and efficient method of removing an oil slick from the water surface. However, uniform mechanical broadcasting of sorbent material has proved to be extremely difficult with present devices. Prior art sorbent material broadcasting devices have been limited to the pneumatic type where the sorbent material in the form of pieces such as cubes, chips or chunks is blown out of a nozzle and dispersed onto the water surface therefrom. However, such pneumatic devices are highly affected by winds which alter the landing location of the sorbent material. It is extremely difficult to get uniformity of dispersion and controllability of the drop rate of the sorbent material from such pneumatic devices.

SUMMARY OF THE INVENTION

According to the present invention, an apparatus is provided which can effectively broadcast oil sorbent material at a controlled rate uniformly over an oil slick for the purpose of removing the oil from the water's surface. The device comprises a rotating cylinder of wire mesh having an endless belt disposed therein. The endless belt contains compartments which are filled with the sorbent materials. When the top side of the endless belt is filled, the endless belt is rotated about an axis, thereby uniformly distributing the sorbent material within the mesh cylinder. The rotating wire mesh cylinder distributes the sorbent materials over the drop area at a controlled rate.

Accordingly, one object of the present invention is to minimize the wind on the distribution of sorbent materials over an oil slick.

Another object of the present invention is to control the distribution rate of sorbent materials over an oil slick.

A still further object of the present invention is to provide uniform distribution of sorbent materials over an oil slick.

Further objects and more complete appreciation of the present invention and its many attendant advantages will develop as the same becomes better understood by reference to the following detailed description when considered in conjunction with the accompanying drawings in which like reference numerals designate like parts throughout the figures thereof and wherein.

DETAILED DESCRIPTION OF THE PREFERRED EMODIMENT

Figure 1:
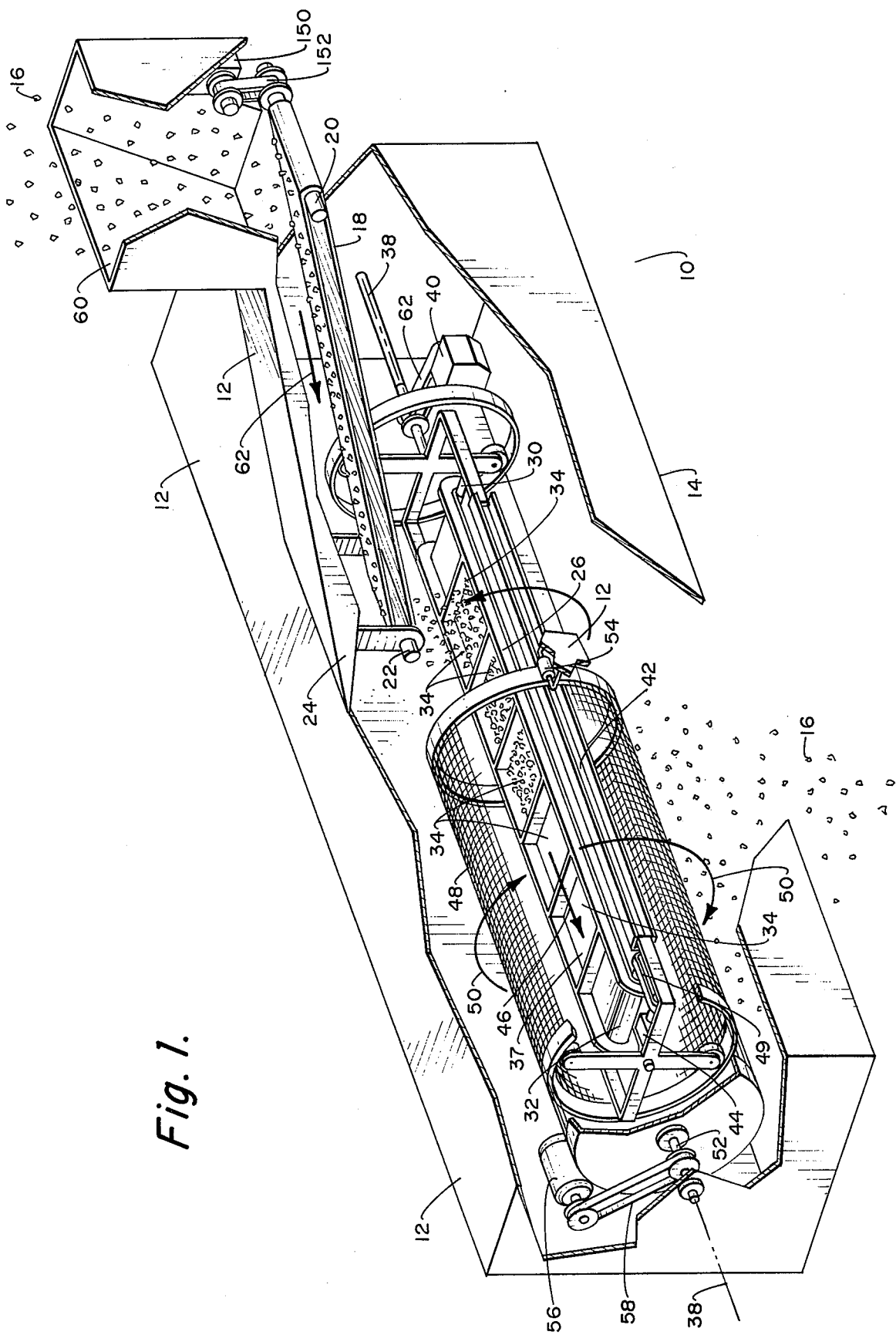
FIG. 1 illustrates one embodiment of the present invention.

Now turning to FIG. 1, embodiment 10 of the present invention is illustrated. Embodiment 10 includes a housing 12 having an open bottom 14 to allow sorbent materials 16 to drop onto an oil slick. Sorbent materials 16 are mechanically or manually deposited upon inclined endless belt 18. Inclined endless belt 18 includes a pair of rollers 20 and 22. Roller 22 is disposed at a low level adjacent opening 24 in housing 12 while roller 20 is disposed at a high level adjacent opening 60 in housing 12. Opening 24 is disposed directly above endless belt 26 such that sorbent materials 26 drop through opening 24 onto endless belt 26. Motor 150 and pulley configuration 152 supply the motive power to move endless belt 18 in the direction of arrow 62.

Endless belt 26 is disposed substantially horizontal with respect to the water surface. Endless belt 26 moves in the direction of arrow 46 between rollers 30 and 32. A plurality of compartments 34 are attached to endless belt 26. Sorbent materials are deposited onto endless belt 26 into compartments 34 from inclined endless belt 18. When the topside 37 of endless belt 26 is filled with sorbent materials, endless belt 26 is rotated about axis 38 by motor 40 via pulley configuration 62. Rollers 30 and 32 are rotatably mounted to endless belt support structure 42.

Motor 44 via pulley configuration 49 connected to roller 32 moves endless belt 26 in the direction indicated by arrow 46.

Wire mesh cylinder 48 rotates in the direction shown by arrows 50 about shaft 52 and rollers 54. Motor 56 via pulley mechanism 58 applies the motive force for rotating wire mesh cylinder 48.

Figure 4A:
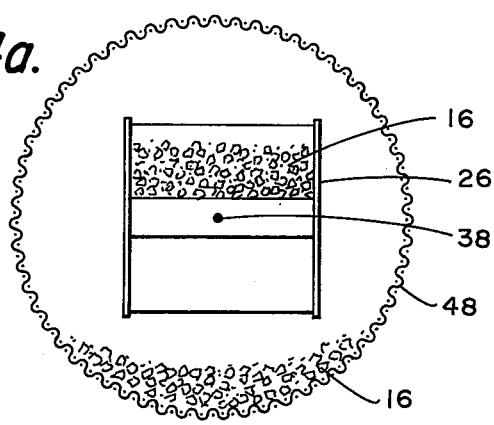
FIGS. 4a and 4b illustrate the rotation of the endless belt of FIGS. 1 and 3.
Figure 4B:
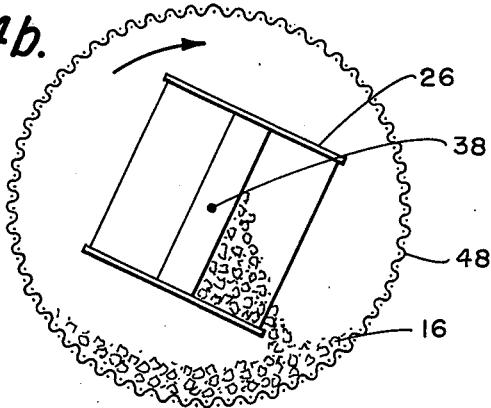

The embodiment shown in FIG. 1 operates as follows. Sorbent material 16 is deposited upon inclined endless belt 18 through opening 60. Sorbent material 16 then moves downward in the direction of arrow 62 exiting endless belt 18 adjacent roller 22 and falling onto horizontal endless belt 26. As each compartment 36 of endless belt 26 fills, endless belt 26 is moved in the direction of arrow 28 until all the compartments 36 on topside 37 within wire mesh cylinder 48 are filled. It is noted that in embodiment 10 the two compartments 36 located closest to opening 24 are not filled with sorbent material 16 when endless belt 26 is rotated. At this time, motor 40 via pulley mechanism 62 rotates endless belt 26 about axis 38, as is graphically illustrated in FIGS. 4a and 4b. Sorbent materials 16 are thereby uniformly distributed within wire mesh cylinder 48. Meanwhile, wire mesh cylinder 48 rotates in the direction of arrow 50, thereby dropping sorbent material 16 onto oil slick at a controllable rate.

Figure 2:
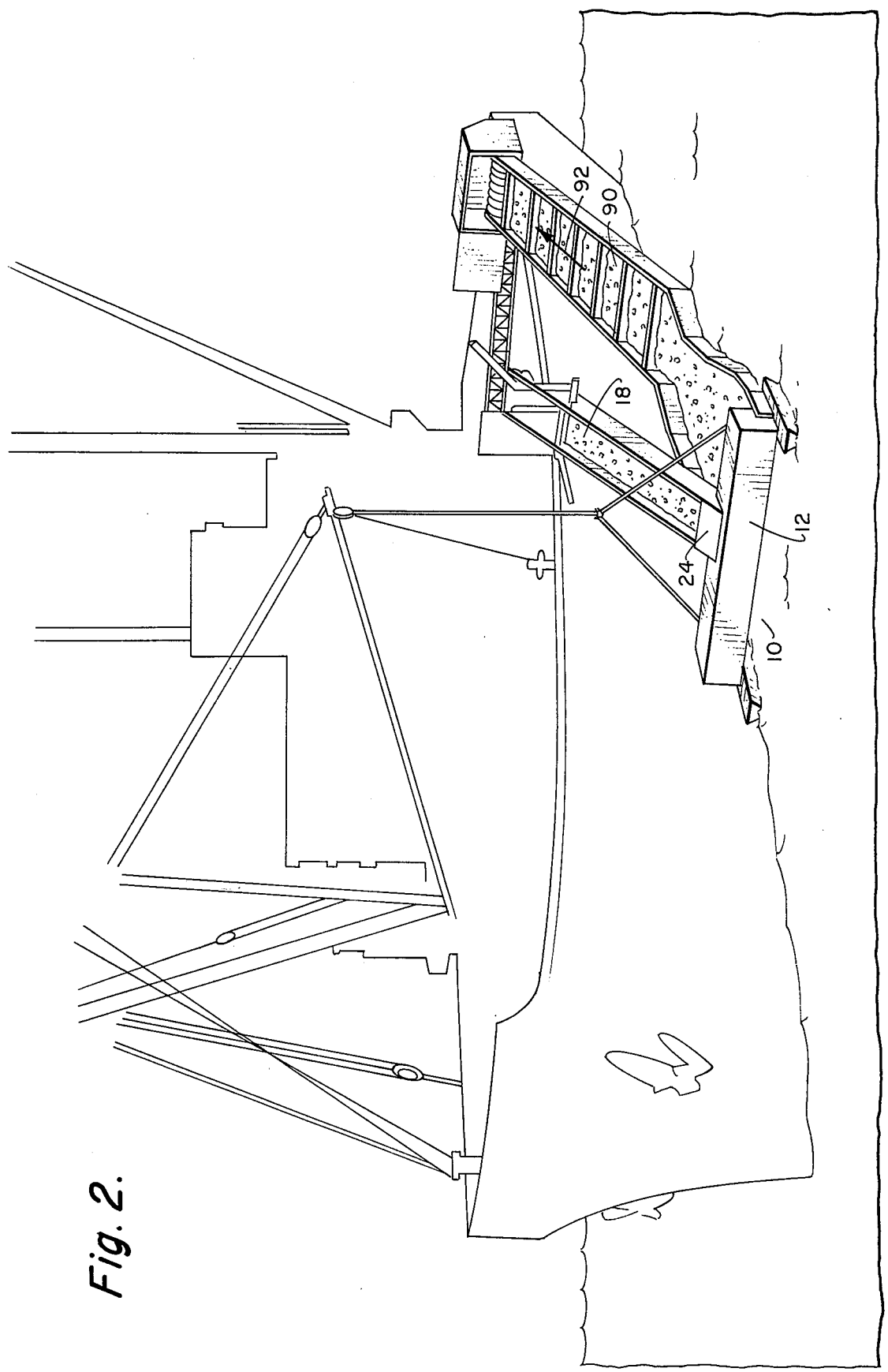
FIG. 2 illustrates the embodiment of FIG. 1 in an operational mode.

Now turning to FIG. 2, the embodiment 10 of FIG. 1 is shown in functional relationship with respect to an oceangoing ship. The sorbent materials 16 enter housing 12 via opening 24. Sorbent materials 16 then fall upon the oil slick whereupon they are collected by a second inclined endless belt 90 which moves the particles in the direction of arrow 92 where they are collected on shipboard. The oil is squeezed out of, or otherwise removed from, sorbent materials 16 and returned to endless belt 18 for reuse.

Figure 3:
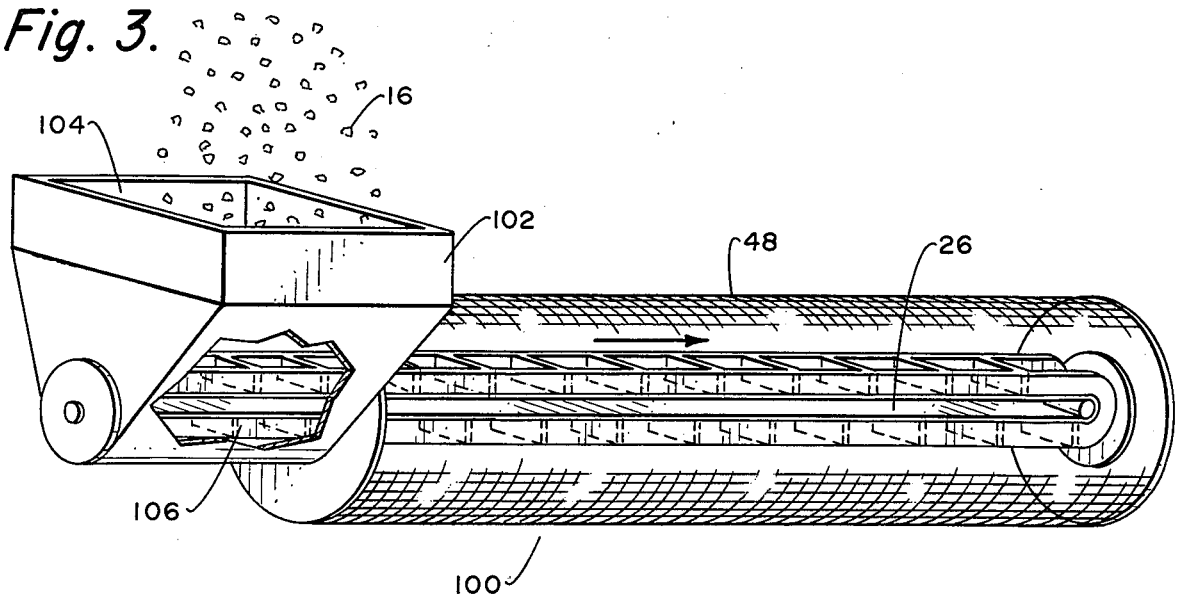
FIG. 3 illustrates a second embodiment of the present invention.

Now turning to FIG. 3, an alternative embodiment 100 is illustrated. The sorbent materials 16 are deposited upon endless belt 26 through a funnel-shaped housing 102 having a large opening 104 and a small opening 106 through which sorbent materials 16 pass before being deposited upon endless belt 26.

The drop rate of sorbent material onto the oil slick is controlled by the rate of rotation of cylinder 48. As wire mesh cylinder 48 is rotated at a faster speed, the drop rate of sorbent material 16 increases. The size of the wire mesh opening with respect to the size of sorbent material 16 also affects the drop rate of sorbent material 16. The larger the openings in the wire mesh with respect to the size of sorbent material 16, the faster the drop rate. Of course, the size of sorbent material 16 must be less than the size of the openings in the wire mesh or the drop rate will be reduced to zero.

It is noted that motors to rotate and provide movement to the endless belt shown in FIG. 3 are not shown but that the motor configurations shown in FIG. 1 are easily adaptable thereto.

It is noted that the metal parts of the embodiments shown in FIGS. 1 and 3 are fabricated of such corrosionresistant materials as are capable of withstanding the harsh seawater environments to which they are subjected.

The motors 40, 44, 56 and 150 of FIG. 1 may be remotely controlled by remotely located switches for directly coupling electrical power thereto.

An alternative method for supplying power to motors 40, 44, 56 and 150 includes power packs such as a battery associated with each individual motor and switches responsive to radio waves for coupling and decoupling power to the respective motors.

Housing 12 may be provided with a transparent section or window through which an observer can determine when endless belt 26 is ready to be rotated about axis 38. Of course, it is envisioned that many alternative electromechanical control devices could be utilized to effect a like result.

Obviously numerous modifications and variations of the present invention are possible in light of the above teachings. It is therefore to be understood that within the scope of the appended claims the invention may be practiced otherwise than as specifically described herein.

I claim:
1. A contollable sorbent broadcaster comprising:
   a. an endless belt assembly moving in a substantially horizontal plane formed between a pair of rollers;
   b. means disposed adjacent one end of said endless belt assembly for depositing sorbent materials onto said endless belt;
   c. means connected to said endless belt assembly for rotating said endless belt assembly about its longitudinal axis such that said sorbent materials fall uniformly; and
   d. means disposed to receive said sorbent material falling from said endless belt for releasing said sorbent material at a controlled rate over a drop area.

2. The apparatus of claim 1 wherein said endless belt assembly further includes a plurality of compartments attached thereto for receiving said sorbent material from said sorbent depositing means.

3. The apparatus of claim 1 wherein said sorbent depositing means includes a funnel-shaped housing having a large and a small opening, said sorbent material entering said housing via said large opening and exiting onto said endless belt assembly via said small opening.

4. The apparatus of claim 1 wherein said sorbent depositing means includes an inclined endless belt moving between an upper roller and a lower roller, sorbent material being deposited upon said inclined endless belt adjacent said upper roller exits onto said endless belt assembly adjacent said lower roller.

5. The apparatus of claim 1 wherein said releasing means includes a rotating wire mesh cylinder.

* * * * *